United States Patent
Song

(10) Patent No.: US 9,690,636 B2
(45) Date of Patent: Jun. 27, 2017

(54) APPARATUS AND METHOD OF DATA COMMUNICATION BETWEEN WEB APPLICATIONS

(75) Inventor: Dong-hyun Song, Suwon-si (KR)

(73) Assignee: Samsung Electronics Co., Ltd. (KR)

(*) Notice: Subject to any disclaimer, the term of this patent is extended or adjusted under 35 U.S.C. 154(b) by 552 days.

(21) Appl. No.: 12/853,827

(22) Filed: Aug. 10, 2010

(65) Prior Publication Data

US 2011/0035756 A1 Feb. 10, 2011

(30) Foreign Application Priority Data

Aug. 10, 2009 (KR) ........................ 10-2009-0073527

(51) Int. Cl.
*G06F 9/54* (2006.01)

(52) U.S. Cl.
CPC ............... *G06F 9/544* (2013.01); *G06F 9/54* (2013.01); *G06F 9/542* (2013.01); *G06F 9/546* (2013.01); *G06F 9/547* (2013.01); *G06F 9/548* (2013.01)

(58) Field of Classification Search
None
See application file for complete search history.

(56) References Cited

U.S. PATENT DOCUMENTS

| 6,175,877 B1 | 1/2001 | Zerber | |
|---|---|---|---|
| 6,430,568 B1* | 8/2002 | Hickey et al. | |
| 7,263,701 B2 | 8/2007 | Yun | |
| 2002/0038388 A1* | 3/2002 | Netter | 709/318 |
| 2003/0037178 A1 | 2/2003 | Vessey et al. | |
| 2005/0229188 A1* | 10/2005 | Schneider | 719/328 |
| 2006/0117321 A1 | 6/2006 | Lauer et al. | |
| 2009/0119679 A1 | 5/2009 | Dowlan et al. | |
| 2009/0249359 A1* | 10/2009 | Caunter et al. | 719/315 |

FOREIGN PATENT DOCUMENTS

| CN | 1777154 | 5/2006 |
|---|---|---|
| EP | 1 296 238 | 3/2003 |
| EP | 1 591 894 | 11/2005 |
| KR | 1020030020819 | 3/2003 |
| TW | 486638 | 5/2002 |
| TW | 200611191 | 4/2006 |
| WO | WO 2006/107137 | 10/2006 |
| WO | WO 2007/009162 | 1/2007 |

OTHER PUBLICATIONS

Meckler, Andrew "Java and Inter-Applet Communication", Oct. 1, 1997.*
Taiwanese Search Report dated Jun. 5, 2015 issued in counterpart application No. 099126480, 14 pages.
Korean Office Action dated Aug. 14, 2015 issued in counterpart application No. 10-2009-0073527, 7 pages.

* cited by examiner

*Primary Examiner* — Qing Wu
(74) *Attorney, Agent, or Firm* — The Farrell Law Firm, P.C.

(57) ABSTRACT

A method and apparatus for data communication between web applications by using a web browser. The web browser includes a web application controller for executing a first web application and a second web application, and a data transferring unit for receiving the data from the first web application and transmitting the data to the second web application.

9 Claims, 4 Drawing Sheets

APPARATUS AND METHOD OF DATA COMMUNICATION BETWEEN WEB APPLICATIONS

PRIORITY

This application claims priority to Korean Patent Application No. 10-2009-0073527, filed on Aug. 10, 2009, in the Korean Intellectual Property Office, the disclosure of which is incorporated herein in its entirety by reference.

BACKGROUND OF THE INVENTION

1. Field of the Invention

The present invention relates to web applications, and more particularly, to methods and apparatuses for data communication between web applications.

2. Description of the Related Art

A web application is an application that is composed of a document coded using web standards such as Extensible Markup Language (XML), HyperText Markup Language (HTML), Java Script, or Cascading Style Sheet (CSS) and operates in a web browser. An example of a web application is a widget that is coded in a website such as Naver or Google, or in a web document. Recently, as web applications have developed and become more complicated, various functions are further required and desired by users. In particular, in a service scenario for operating a plurality of related web applications, there is a need for a function of transmitting and receiving required data between the web applications.

FIG. 1 is a structural view illustrating a typical apparatus for data communication between a web application A 140 and a web application B 150.

In order to transmit and receive data between web application A 140 and web application B 150 that operate in a web browser 130, the data needs to be passed through a web server 110. In detail, in order for web application A 140 to transmit the data to web application B 150, a java script controller 145 of web application A 140 transmits the data to a data transferring device or socket 120 of the web server 110, and a java script controller 155 of web application B 150 receives the data from the data transferring device 120 of the web server 110. Thus, in order to perform data communication between web application A 140 and web application B 150, a client device needs to be accessed over the Internet, the web server 110 needs to be used, and the web server 110 needs to have a function of transmitting data to a particular web application.

SUMMARY OF THE INVENTION

Aspects of the present invention provide methods and apparatuses for data communication between web applications that operate in a web browser.

According to an aspect of the present invention, there is provided an apparatus for data communication between web applications by using a web browser, wherein the web browser includes a web application controller for executing a first web application and a second web application, and a data transferring unit for receiving the data from the first web application and transmitting the data to the second web application.

The first web application may transmit identification information of the second web application and the data to the data transferring unit, and the data transferring unit may transmit the data to the second web application corresponding to the identification information.

The web application controller may manage information regarding the first web application and the second web application, and the data transferring unit may determine the second web application as a target web application to which the data is to be transmitted, based on the information.

According to another aspect of the present invention, there is provided a method of data communication between web applications which includes executing a first web application and a second web application; and transmitting data from the first web application to the second web application through a data transferring unit included in a web browser.

According to another aspect of the present invention, there is provided a computer readable recording medium having recorded thereon a program for executing the method of data communication between web applications.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

The present invention will now be described more fully with reference to the accompanying drawings, in which embodiments of the invention are shown.

Figure 1:
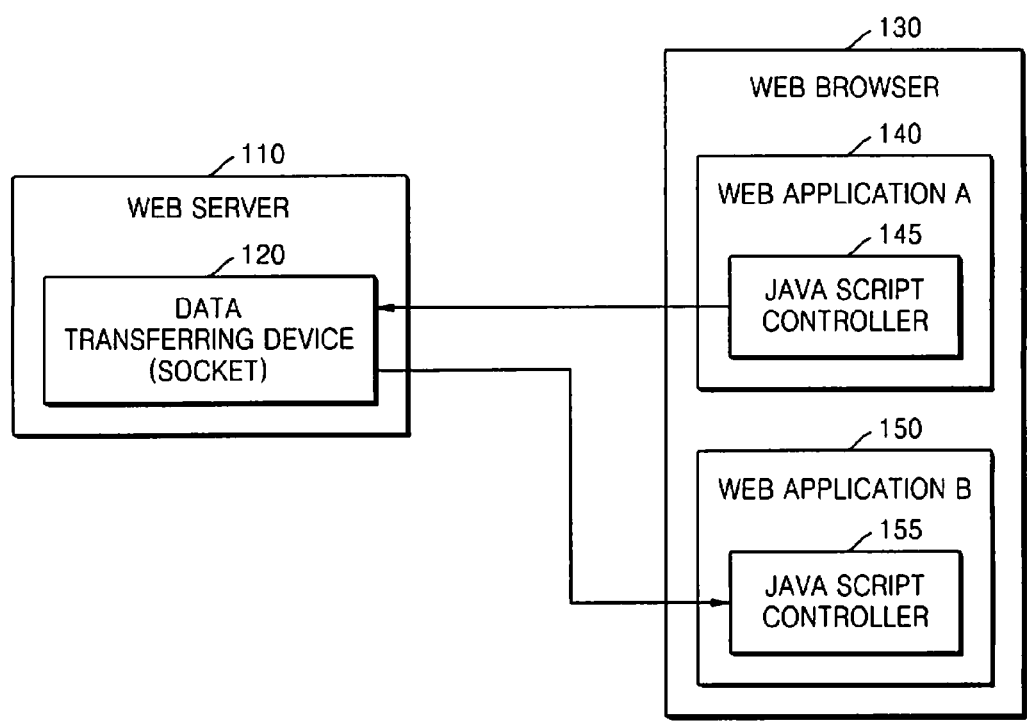
FIG. 1 is a structural view illustrating a typical apparatus for data communication between web applications.
Figure 2:
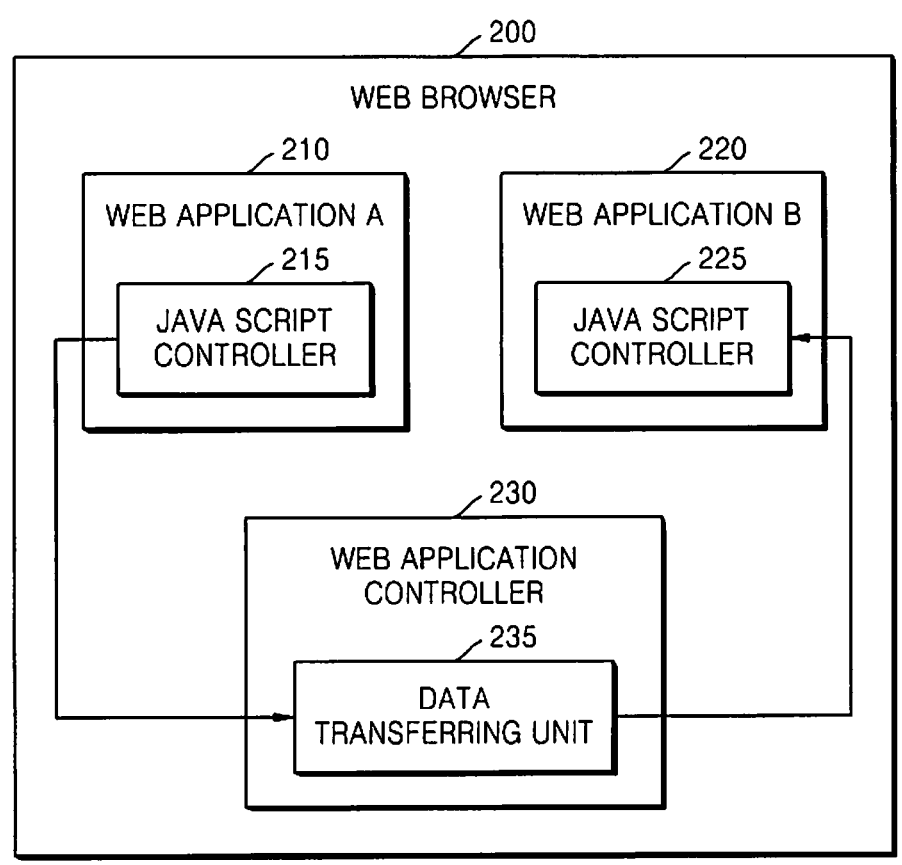
FIG. 2 is a structural view illustrating an apparatus for data communication between web applications, according to an embodiment of the present invention.

FIG. 2 is a structural view illustrating an apparatus for data communication between a web application A 210 and a web application B 220, according to an embodiment of the present invention, and illustrates a web browser 200 installed in the apparatus for data communication between web applications A 210 and B 220.

Referring to FIG. 2, the apparatus for data communication between web applications A 210 and B 220 is an apparatus which includes, but is not limited to, a personal computer (PC), a television (TV), a mobile device, or a printer, in which the web browser 200 is installed. A plurality of web applications may operate in the web browser 200. A web application controller 230 executes web application A 210 and web application B 220, and hosts and controls both web application A 210 and web application B 220. The web application controller 230 includes a data transferring unit 235. The data transferring unit 235 receives data from web application A 210, and transmits the data to web application B 220. The data transferring unit 235 may include a file or memory for storing the received data. Of course, data may be transferred by data transferring unit 235 from web application B 220 to web application A 210.

Web application A 210 transmits, to the data transferring unit 235, the data together with identification information of web application B 220 that is a target web application to which the data is to be transmitted. The data transferring unit 235 determines a target web application to which the data is to be transmitted, based on the transmitted identification information. To this end, web application controller 230 manages information regarding operating web applications. The data transferring unit 235 may search for the identification information transmitted from web application A 210 from among information managed by web application controller 230. Thus, the data transferring unit 235 may determine web application B 220 as a target web application, and may know a location of web application B 220. Then, the data transferring unit 235 may transmit the data to web application B 220.

Web application A 210 and web application B 220 may include java script controllers 215 and 225, respectively, so as to transmit and receive data. To this end, a predetermined java script function for transmitting and receiving data may be contained in web application A 210 and web application B 220. For example, web application A 210 contains the following java script so as to generate java script data including the identification information of web application B 220 and data to be transmitted. In this case, the identification information of web application B 220 is "Web_B", and the data to be transmitted is "value". When SendEvent( ) is called, a web event may occur, and the data transferring unit 235 may store the generated java script data in a file or a memory.

```
var test_event = new WebEvent( );
test_event.data = "value";
sendEvent("Web_B", test_event);
```

Web application B 220 may contain the following java script code, and thus may receive the Java script data generated by web application A 210. When a web event occurs, the data transferring unit 235 reads the java script data, and transmits the java script data to web application B 220. Web application B 220 may perform a predetermined function by using event.data, that is, a "value" contained in the received java script data.

```
window.onWebEvent = function(event)
{
    Process using received data, event.data;
}
```

Figure 3:
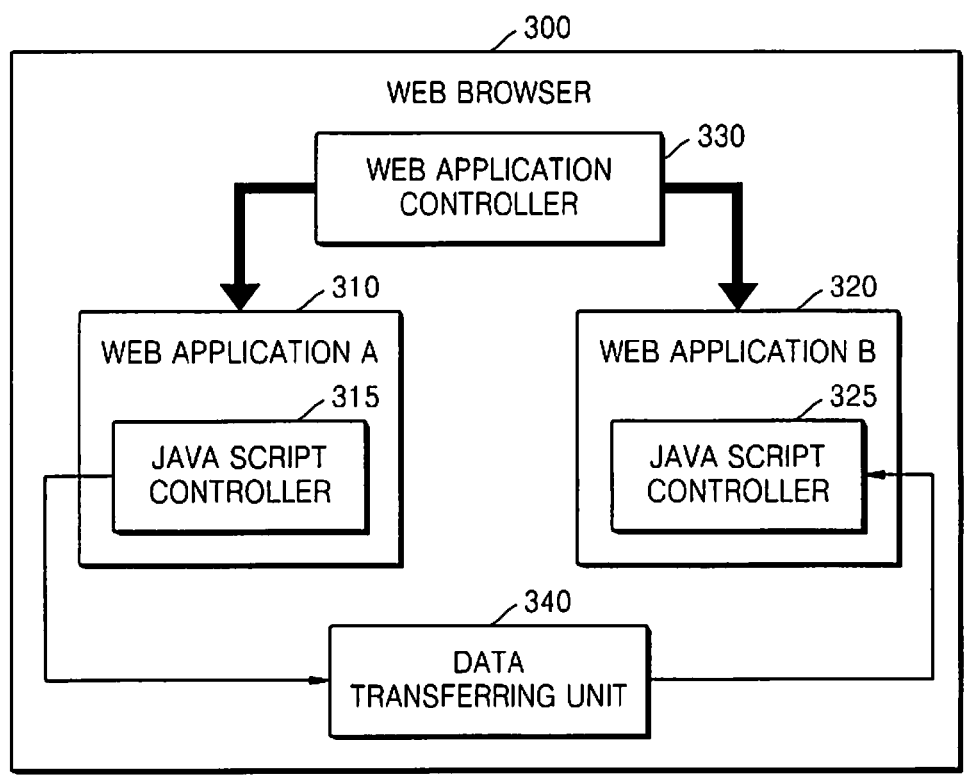
FIG. 3 is a structural view illustrating an apparatus for data communication between web applications, according to another embodiment of the present invention.

FIG. 3 is a structural view illustrating an apparatus for data communication between a web application A 310 and a web application B 320, according to another embodiment of the present invention, and illustrates a web browser 300 installed in the apparatus for data communication between the web applications A 310 and B 320. The web browser 300 of FIG. 3 is the same as the web browser 200 of FIG. 2, except that a web application controller 330 and a data transferring unit 340 are separately installed.

Referring to FIG. 3, web application controller 330 controls web application A 310 and web application B 320, and maintains and manages information regarding both web application A 310 and web application B 320. Web application A 310 and web application B 320 may include java script controllers 315 and 325, respectively, so as to exchange data by using a Java script code. The java script controllers 315 and 325 transmit and receive data through the data transferring unit 340.

Figure 4:
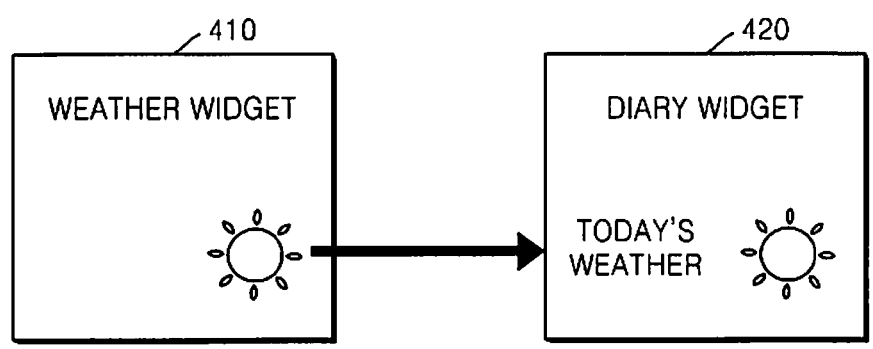
FIG. 4 is a diagram showing images for data communication between a weather widget and a diary widget, according to an embodiment of the present invention.

FIG. 4 is a diagram showing images for data communication between a weather widget 410 and a diary widget 420, according to an embodiment of the present invention.

Referring to FIG. 4, two web applications, weather widget 410 and diary widget 420 are operating. Weather information contained in weather widget 410 is transmitted to a data transferring unit included in a web browser by a java script controller included in weather widget 410. A Java script controller of diary widget 420 receives weather information from the data transferring unit, and displays the weather information on a screen.

Figure 5:
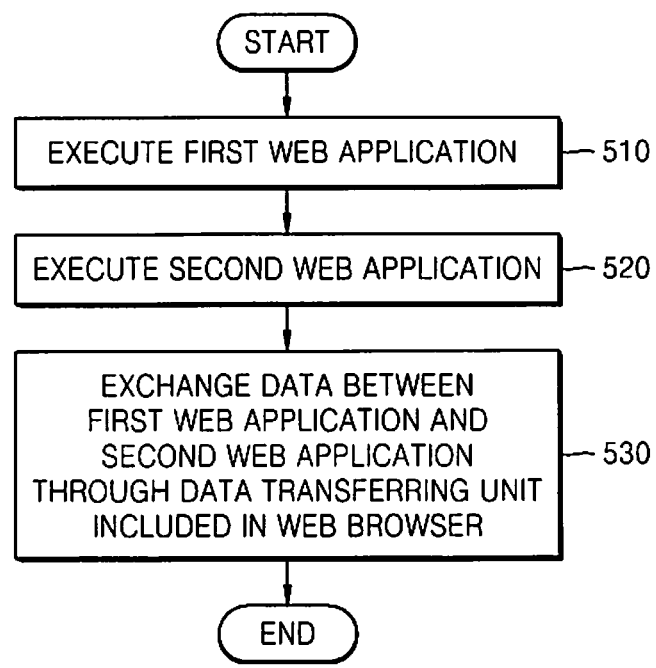
FIG. 5 is a flowchart showing a method of data communication between web applications, according to an embodiment of the present invention.

FIG. 5 is a flowchart showing a method of data communication between web applications, according to an embodiment of the present invention.

First, a plurality of web applications operate in a web browser. In detail, a first web application and a second web application are executed and operate at steps 510 and 520. Data is exchanged between the first web application and the second web application through a data transferring unit included in the web browser in step operation 530. The data is exchanged in a manner described with reference to FIGS. 2 through 4.

As described above, according to one or more of the above embodiments of the present invention, when a client device is not accessed over the Internet, data communication between web applications may be realized through a data transferring path in the client device without any help of a web server.

The present invention can also be embodied as computer readable codes on a non-transitory computer readable recording medium. The computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, optical data storage devices, etc. The non-transitory computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for data communication between web applications using a web browser, wherein the web browser comprises:
a hardware processing unit configured to execute a web application controller that executes a first web application and a second web application, and
a data transferring unit configured to receive, from the first web application, data and identification information of a target web application to which the data is to be transmitted, in response to determining, by the first web application, the target web application from among at least one web application executing in the apparatus, determine the second web application corresponding to the identification information as the target web application from among the at least one web application executing in the apparatus, and transmit the data to the determined target web application.

2. The apparatus of claim 1, wherein the first web application includes a first java script controller, and generates java script data comprising the data by using the first java script controller, and wherein the second web application includes a second java script controller, and receives the java script data by using the second java script controller.

3. The apparatus of claim 1, wherein the data transferring unit includes a file or memory for storing the data.

4. The apparatus of claim 1, wherein the data transferring unit is included in the web application controller.

5. The apparatus of claim 1, wherein the web application controller manages information regarding the first web application and the second web application, and wherein the data transferring unit determines the second web application as a target web application to which the data is to be transmitted, based on the information.

6. A method of data communication between web applications in an apparatus, the method comprising:

executing a first web application and a second web application;

receiving, from the first web application, data and identification information of a target web application to which the data is to be transmitted, in response to determining, by the first web application, the target web application from among at least one web application executing in the apparatus;

determining the second web application corresponding to the identification information as the target web application from among the at least one web application executing in the apparatus; and transmitting the data to the determined target web application through a data transferring unit included in a web browser.

7. The method of claim 6, wherein the data is included in java script data generated in the first web application, and the java script data including the data is received by the second web application.

8. The method of claim 6, further comprising:

managing information regarding the first web application and the second web application, wherein determining the second web application comprises determining the second web application as the target web application to which the data is to be transmitted, based on the information.

9. A non-transitory computer readable recording medium having recorded thereon a program for executing a method of data communication between web applications in an apparatus, wherein the method comprises:

executing a first web application and a second web application;

receiving, from the first web application, data and identification information of a target web application to which the data is to be transmitted, in response to determining, by the first web application, the target web application from among at least one web application executing in the apparatus;

determining the second web application corresponding to the identification information as the target web application from among the at least one web application executing in the apparatus; and transmitting the data to the determined target web application through a data transferring unit included in a web browser.

* * * * *